United States Patent [19]

Park et al.

[11] Patent Number: 5,011,803

[45] Date of Patent: Apr. 30, 1991

[54] LEAD MAGNESIUM NIOBATE CERAMIC DIELECTRICS HAVING LOW SINTERING TEMPERATURES

[75] Inventors: Hyun D. Park, Chelmsford, Mass.; Joseph D. Nance, Honea Path, S.C.

[73] Assignee: Kemet Electronics Corporation, Greenville, S.C.

[21] Appl. No.: 463,308

[22] Filed: Jan. 10, 1990

[51] Int. Cl.$^5$ .............................................. C04B 35/46
[52] U.S. Cl. ...................................... 501/136; 501/17; 501/134; 501/135
[58] Field of Search ....................... 501/134, 135, 136; 501/17

[56] References Cited

U.S. PATENT DOCUMENTS

| | | |
|---|---|---|
| 2,277,734 | 3/1942 | Wainer et al. |
| 2,864,713 | 12/1958 | Lewis |
| 4,027,209 | 3/1977 | Maher |
| 4,078,938 | 3/1978 | Yonezawa et al. |
| 4,216,102 | 8/1980 | Furukawa et al. |
| 4,266,265 | 5/1981 | Maher |
| 4,287,075 | 9/1981 | Fujiwara et al. .................. 106/39.5 |
| 4,550,088 | 10/1985 | Park et al. .......................... 501/135 |
| 4,582,814 | 4/1986 | Thomas |
| 4,812,426 | 3/1989 | Takagi et al. |

OTHER PUBLICATIONS

United Kingdom Application No. 2,039,877A.
Japanese Kokai No. 57-208004.
Japanese Kokai No. 57-189407.

*Primary Examiner*—William R. Dixon, Jr.
*Attorney, Agent, or Firm*—Banner, Birch, McKie & Beckett

[57] ABSTRACT

Dielectric materials comprise perovskite of lead, magnesium, niobium, iron and tungsten oxides, the residue of two types of sintering aids and transition metal oxide component.

12 Claims, 1 Drawing Sheet

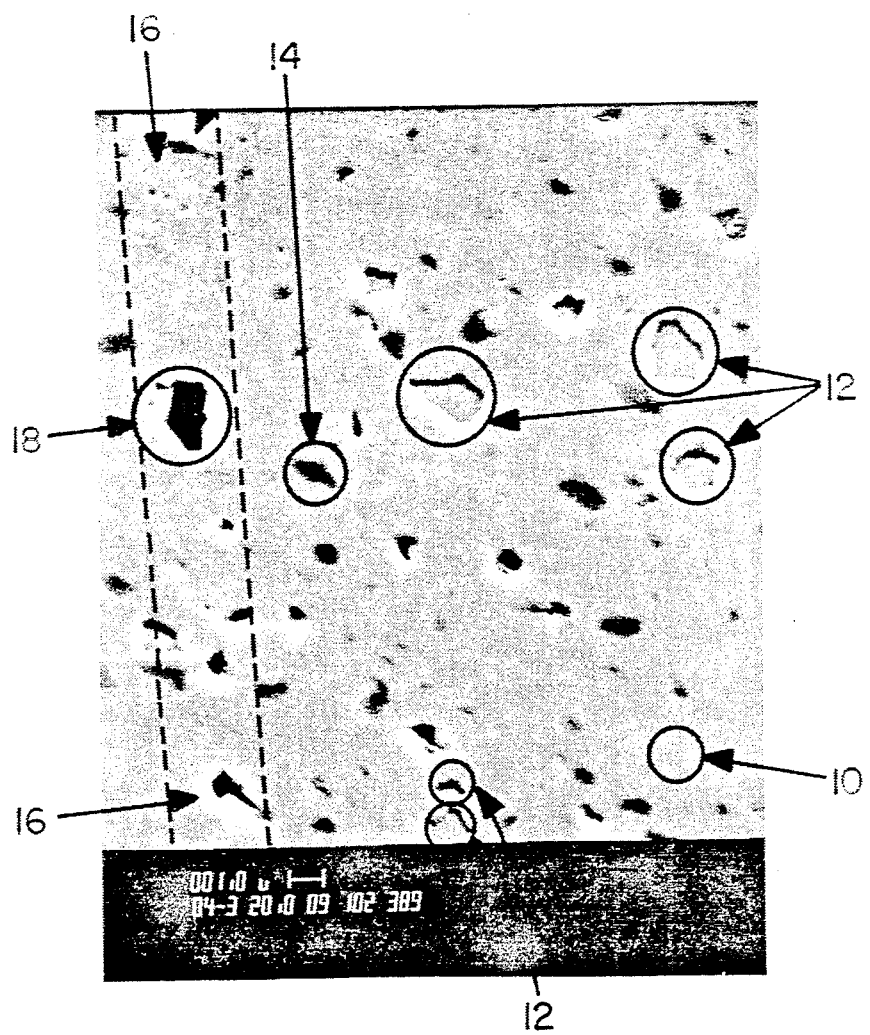

LEAD MAGNESIUM NIOBATE CERAMIC DIELECTRICS HAVING LOW SINTERING TEMPERATURES

This invention relates to ceramic dielectric compositions having high dielectric constants, high insulation resistances and low dissipation factors. Preferably the compositions are capable of being formed by sintering at temperatures below about 900° C.

BACKGROUND

Considerable efforts have been expended to develop ceramic dielectric materials that are capable of being produced by sintering at sufficiently low temperatures that relatively inexpensive metals can be used as electrodes for fabricating capacitors. Electrode metals such as palladium, silver/palladium alloy, platinum and silver/platinum alloy have been used in order to withstand the high sintering temperatures required to produce many types of ceramic capacitors. These electrode materials, due to the presence of palladium or platinum, constitute a significant expense in the fabrication of a capacitor. Less expensive materials such as silver have lower melting temperatures (silver melts at 961° C.) and thus, to enable fabrication of a viable ceramic capacitor, the dielectric material must be capable of being formed at sintering temperatures sufficiently low that the electrode material does not melt or unduly soften and does not migrate into the dielectric material and adversely affect the performance of the capacitor.

In order to make, especially on a reproducible basis as required for commercial production, ceramic capacitors, the sintering should produce a uniform, dense ceramic body. Characteristic of insufficiently sintered ceramics is the presence of open, or porous, structures and incomplete formation of perovskite phases. Modifications can be made to precursor compositions, e.g., by the inclusion of sintering aids and changes in perovskite phase-forming components, in attempts to provide a composition capable of being sintered at lower temperatures. However, these modifications must be carefully made to avoid untoward effects on the performance of the capacitor.

Demanding performance standards exist for capacitors. Minimum specifications frequently include a dielectric constant of at least about 10,000 at 25° C., a dissipation factor of less than about 3 percent, and high insulation resistance (at least $10^{12}$ ohm-cm at 25° C.). Moreover, extremely high reproducability, reliability and freedom from failures with operation are essential. See, for instance, Electric Industries Association Standard RS-198-C (November 1983) for Z5U-type capacitors.

Park, et al., in U.S. Pat. No. 4,550,088, disclose lead oxide-based dielectric ceramic materials which are capable of being sintered at temperatures in the range of 900° to 1000° C. and which contain 64.32 to 66.20 weight percent PbO, 2.49 to 6.67 weight percent $Fe_2O_3$, 24 18 to 24.14 weight percent $Nb_2O_5$, 2.09 to 3.59 weight percent MgO, 0.025 to 0.10 weight percent $MnO_2$ and 0.20 to 1.50 weight percent of a sintering aid additive having a melting point of no more than 775° C. and a resistivity at 25° C. of at least $10^{13}$ ohm-cm, wherein the sintering aid contains one or more of $GeO_2$, $SiO_2$, $Bi_2O_3$, CdO, ZnO, $Al_2O_3$, CuO and $B_2O_3$ chemically combined with at least 20 weight percent of PbO.

Furukawa, et al., in U.S. Pat. No. 4,216,102 disclose a ceramic composition containing a solid solution of $Pb(Mg_{\frac{1}{3}}NB_{\frac{2}{3}})O_3-Pb(Fe_{\frac{1}{2}}NB_{\frac{1}{2}})O_3$ which is said to be capable of being formed by sintering at 800° to less than 1000° C. The patentees disclose various additives such as $Pb(Mn_{\frac{2}{3}}W_{\frac{1}{3}})O_3$, $Pb(Mn_{\frac{1}{2}}W_{\frac{1}{2}})O_3$, $Pb(Mn_{\frac{1}{3}}Nb_{\frac{2}{3}})O_3$, $Li_2O$, $Cr_2O_3$ and $CeO_2$. The basic ceramic composition consists of 67.99 to 68.58 weight percent PbO, 0.61 to 8.51 weight percent $Fe_2O_3$, 1.23 to 3.92 weight percent MgO and 22.27 to 26.89 weight percent $Nb_2O_5$.

Yonezawa, et al., in U.S. Pat. No. 4,078,938, disclose ceramic compositions which purportedly can be sintered at temperatures below about 1000° C. which contain $Pb(Fe_{\frac{2}{3}}W_{\frac{1}{3}})_x(Fe_{\frac{1}{2}}Nb_{\frac{1}{2}})_{1-x}O_3$ where 0.2 to 0.5.

Fujiwara, et al., in U.S. Pat. No. 4,287,075 disclose a ceramic composition having a solid solution structure of $Pb(Fe_{\frac{1}{2}}Nb_{\frac{1}{2}})O_3-Pb(Mg_{\frac{1}{3}}Nb_{\frac{2}{3}})O_3 -Pb(Mg_{\frac{1}{2}}W_{\frac{1}{2}})O_3$. This composition comprises 64.80 to 68.58 weight percent PbO, 0 to 11 46 weight percent $Fe_2O_3$, 0.3 to 3.92 weight percent MgO, 9.65 to 26.89 weight percent $Nb_2O_5$ and 0 to 16.83 weight percent $WO_3$. Additives include MnO, $Pb(Mn_{\frac{2}{3}}W_{\frac{1}{3}})O_3$, $Pb(Mn_{\frac{1}{2}}W_{\frac{1}{2}})O_3$, $Pb(Mn_{\frac{1}{3}}Nb_{\frac{2}{3}})O_3$, $Pb(Mn_{\frac{1}{2}}Ta_{\frac{1}{2}})O_3$, $Li_2O$, $Cr_2O_3$ and $CeO_2$.

Japanese Patent Application Kokai No. 57-208004 describes ceramic dielectric material especially useful for laminated capacitors containing $Pb(Mg_{\frac{1}{3}}Nb_{\frac{2}{3}})O_3-CdTiO_3 -Pb(Fe_{\frac{2}{3}}W_{\frac{1}{3}})O_3$. Exemplified additives are $MnO_2$, $CeO_2$, $Cr_2O_3$ and CoO. Japanese Patent Application Kokai No. 57-189407 describes also ceramic compositions useful for dielectrics for laminated capacitors containing $Pb(Mg_{\frac{1}{3}}Nb_{\frac{2}{3}}) O_3-CdTiO_3$. Additives specifically described are $MnO_2$, $Fe_2O_3$, $Cr_2O_3$, $CeO_2$ and $WO_3$. The applicants state that PbO.MgO are to be used in excess. When the components are not within the specific ranges described in the publication, the materials are said not to insert or have low dielectric constants or have large dielectric loss.

Takagi, et al., in U.S. Pat. No. 4,812,426 disclose lead powders containing perovskite-type lead-containing oxides The powder is prepared by (a) mixing and calcining a material selected from a broad group of components, (b) adding a lead substance, and (c) calcining the mixture. The materials in step (a) include oxides containing titanium, zirconium, lithium, copper, magnesium, nickel, barium, calcium, strontium, zinc, manganese, cobalt, tin, iron, cadmium, antimony, aluminum, rare earth metals, indium, selenium, niobium, tantalum, bismuth, tungsten, tellurium, rhenium and mixtures thereof.

Thomas in U.S. Pat. No. 4,582,814, discloses dielectric compositions having 95.5 to 99.4 weight percent of $(Sr_xPb_{l-x}TiO_3)_a(PbMg_rW_sO_3)_b$ and 4.5 to 6.0 weight percent of a mixture of metal oxides or precursors thereof consisting essentially of (1) binary oxide of a transition metal selected from the group consisting of Co, Ni, Cr, Mn and mixtures thereof, (2) Cd titanate, Zn titanate or mixtures thereof, and (3) a polynary oxide selected from the group consisting of Cd zirconate, Zn zirconate, Cd stannate, Zn stannate and mixtures thereof.

Maher in U.S. Pat. No. 4,027,209, discloses dielectric material comprising $Pb_{l-x}La_x(Zr_yTi_{l-y})_{l-x/4}O_3$ which is doped with 0.1 to 10 weight percent silver. The capacitor may contain low temperature glass which may comprise glass formers selected from $B_2O_3$, $SiO_2$, $GeO_2$, $Al_2O_3$, ZnO, CdO, $Bi_2O_3$ and PbO. United Kingdom published patent application 2,039,877A discloses a similar composition but further containing barium titanate. See also, U.S. Pat. No. 4,266,265 in which high cadmium-content silicates are used as flux in similar capacitor formulations.

Lewis in U.S. Pat. No. 2,864,713 discloses various niobate compounds having dielectric properties. The compositions have the formula (l-x)L$_2$O-xMO-R$_2$O$_5$ wherein L is sodium which may be partially replaced by potassium, M is cadmium or lead and R is niobium which may be partially replaced by tantalum.

Walker, et al., in U.S. Pat. No. 2,277,734, disclose as dielectric materials, the product of firing at high temperature a composition of 80 to 97 percent titanium dioxide and the balance of preformed titanate of calcium, strontium, barium, cadmium, zinc and divalent lead.

SUMMARY OF THE INVENTION

By this invention lead magnesium niobate-rich dielectric materials (perovskite phase-containing) are provided that not only exhibit the desirable capacitor performance properties of the lead magnesium niobate dielectric but are capable of being sintered at relatively low temperatures. In accordance with this invention, a lead-containing oxide component is provided which is rich in lead, magnesium and niobium and also contains iron and tungsten. The material further contains the residue of two types of sintering aids: first, cadmium oxide and, second, the residue of a low melting (e.g., 700° to 900° C.) glass frit which frit contains at least about 20 weight percent lead oxide chemically combined. The material also contains a sufficient amount of at least one of titanium dioxide, zirconium dioxide and hafnium dioxide to increase the insulation resistance of the dielectric material.

In a preferred aspect of the invention, the dielectric material comprises:

(a) lead-containing oxide component (expressed in terms of oxides) consisting essentially of, based on the total weight of the lead-containing oxide component, 2 to 5 weight percent MgO, 20 to 30 weight percent Nb$_2$O$_5$, 0.5 to 7 weight percent Fe$_2$O$_3$, 0.5 to 5 weight percent WO$_3$ and PbO wherein the amount of lead (based on the total lead in the material) is between about 85 to 110 atomic percent of that required on a stoichiometric basis to satisfy the relationship:

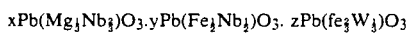

(based on the total niobium and iron in the material) wherein x is between about 0.8 and 0.92, y is between about 0.005 and 0.165 and z is between about 0.035 and 0.075, wherein the atomic ratio of tungsten to iron (based on total tungsten and iron in the material) is less than about 0.49:1, and wherein the atomic ratio of magnesium to niobium (based on total magnesium and niobium in the material) is between about 0.55:1 and 0.42:1;

(b) cadmium component (expressed in terms of CdO) in an amount of about 1 to 5 weight percent based on the total material;

(c) transition metal component (expressed in terms of oxides) of at least one of TiO$_2$, ZrO$_2$ and HfO$_2$, said transition metal component being in an amount sufficient to increase the insulation resistance of the material as compared to the insulation resistance of an otherwise identical material but not containing the transition metal component; and (d) sintering aid residue (expressed in terms of oxides) in an amount of about 0.2 to 2 weight percent based on the total weight of the material, said sintering aid residue comprising one or more of GeO$_2$, SiO$_2$, Bi$_2$O$_3$, ZnO, Al$_2$O$_3$, CuO and B$_2$O$_3$, which as the sintering aid are provided in combination with PbO such that the sintering aid has a melting point of between about 650° to 900° C. In this aspect of the invention, the provision of the atomic ratios of tungsten to iron and magnesium to niobium within the ranges of oxides in the lead-containing oxide component enables (in combination with the cadmium component, transition metal component and glass sintering aid) dielectric materials having advantageous dielectric constants and insulation resistances to be provided at relatively low sintering temperatures, e.g., below about 950° C., preferably below about 900° C..

In another preferred aspect of the invention, the dielectric material comprises at least three discrete phases:

(a) a continuous, lead-containing oxide-rich phase comprising (expressed as oxides) PbO, Nb$_2$O$_5$, Fe$_2$O$_3$, MgO and WO$_3$;

(b) discontinuous, cadmium-containing phase consisting essentially of cadmium oxide; and (c) discontinuous, sintering aid residue-containing phase comprising (expressed as oxides) one or more of GeO$_2$, SiO$_2$, Bi$_2$O$_3$, ZnO, Al$_2$O$_3$, CuO and B$_2$O$_3$, wherein the material contains the following expressed as oxides in weight percent based on their total weight: about 55 to 69 percent PbO, about 18 to 30 percent Nb$_2$O$_3$, about 2 to 5 percent MgO, about 0.5 to 7 percent Fe$_2$O$_3$, about 0.5 to 5 percent WO$_3$, about 1 to 5 percent CdO, about 0 5 to 3.5 percent in the aggregate of one or more of TiO$_2$, ZrO$_2$ and HfO$_2$, and about 0.2 to 2 percent of sintering aid residue. In this aspect of the invention, the provision of two discrete sintering promoting phases, i.e., the cadmium-containing phase and the sintering aid residue-containing phase, enables the sintering temperatures of the lead magnesium niobate-rich perovskite phase to be substantially lowered without the deleterious effects on capacitor performance expected in view of the total amount of sintering promoting components present. The sintering temperatures are often below about 950° C., preferably below about 900° C.

The dielectric materials of this invention may be fabricated into capacitors. The capacitors comprise a dielectric body comprising the dielectric material and two spaced-apart electrodes in contact therewith. Generally, the fabricated capacitors are multilaminar. Preferably, the electrodes are silver or alloy rich in silver.

BRIEF DESCRIPTION OF THE FIGURE

The FIGURE depicts a scanning electron photomicrograph (original magnification 4000×) of the microstructure of a multilayered capacitor having the dielectric material containing three discrete phases.

DETAILED DESCRIPTION

Dielectric properties of the dielectric materials of this invention are provided by lead-containing oxide perovskite-phase materials. In the presence of iron, niobium and tungsten oxides, various perovskite structure is thought to be able to form. Often, a single, solid solution perovskite phase is observed, e.g., through X-ray powder diffraction, rather than a plurality of possible discrete perovskite phases, e.g., Pb(Fe$_\frac{1}{2}$Nb$_\frac{1}{2}$)O$_3$, Pb(Mg$_\frac{1}{3}$Nb$_\frac{2}{3}$)O$_3$, Pb(Fe$_\frac{2}{3}$W$_{1⁄66}$)O$_3$, and Pb(Mg$_\frac{1}{2}$W$_\frac{1}{2}$)O$_3$.

Thus, the various elements, lead, iron, magnesium, niobium and tungsten, are thought to be atomically intermixed.

$Pb(Mg_{\frac{1}{3}}Nb_{\frac{2}{3}})O_3$ is generally considered to have particularly desirable performance properties for capacitors, however, it has a relatively high sintering temperature, i.e., about 1200° C. Other perovskites, such as $Pb(Fe_{\frac{2}{3}}W_{\frac{1}{3}})O_3$, may have lower sintering temperatures but may have shortcomings in one or more of dielectric constant, dissipation factor, insulation resistance, thermal stability of electrical properties or Curie temperature. For many commercial applications of capacitors, Curie temperatures of about ambient temperature are desirable. For purposes herein, reference to Curie temperature will connote the temperature or temperature range of the maximum dielectric constant.

By the present invention, a lead-containing oxide material is provided which is rich in the desirable lead magnesium niobate but is sinterable at significantly lower temperature. Advantageously, the performance of the dielectric material is not unduly deleteriously affected as a result of providing a composition sinterable at the lower temperatures. The lead oxide-containing component in dielectric materials in accordance with this invention contain (expressed as the oxides) PbO, MgO, $Nb_2O_5$ and $WO_3$ in amounts such that at least one perovskite phase forms. For the sake of facilitating description of the perovskite phase, reference is made herein to the traditional expressions for perovskite structure, i.e., $Pb(Mg_{\frac{1}{3}}Nb_{\frac{2}{3}})O_3$, $Pb(Fe_{\frac{1}{2}}Nb_{\frac{1}{2}})O_3$ and $Pb(Fe_{\frac{2}{3}}W_{\frac{1}{3}})O_3$. While not wishing to be limited to theory, it is believed that by providing sufficient $Pb(Fe_{\frac{1}{2}}Nb_{\frac{1}{2}})O_3$ and $Pb(Fe_{\frac{2}{3}}W_{\frac{1}{3}})O_3$ in relative amounts to each other, the lead-containing oxide component will be able to be sintered in the presence of cadmium sintering aid and lead glass sintering aid at the desired, relatively low temperatures without undue adverse effect on the performance properties of the dielectric.

In broad aspects, the composition of the lead-containing oxide component is as follows based on the total weight of the listed oxide as they are contained in the material:

|  | General | Preferred |
| --- | --- | --- |
| PbO | 71 to 60 | 70 to 64 |
| MgO | 2 to 5 | 3.0 to 4.5 |
| $Nb_2O_5$ | 15 to 30 | 18 to 28 |
| $Fe_2O_3$ | 0.5 to 7 | 1 to 5 |
| $WO_3$ | 0.5 to 5 | 0.6 to 4 |

In preferred aspects of the invention, the atomic ratio of W:Fe is less than 0.49:1, most preferably, less than about 0.48:1, say, about 0.3:1 or 0.4:1 to 0.48:1. The preferred atomic ratio of Mg:Nb is often about 0.4:1 to 0.55:1, say, about 0.45:1 to 0.55:1. The amount of lead in relation to the other oxide components in the lead-containing oxide component may vary widely and the component may be lead rich or, preferably, lead deficient from that required on a stoichiometric basis to form perovskite crystalline phase. The total lead in the dielectric material (including that provided by the sintering aid) is often between about 85 to 110, preferably about 90 to 105, more preferably about 90 to 99, atomic percent of that required on a stoichiometric basis to satisfy the relationship $$xPb(Mg_{\frac{1}{3}}Nb_{\frac{2}{3}})O_3 \cdot yPb(Fe_{\frac{1}{2}}Nb_{\frac{1}{2}})O_3 \cdot zPb(Fe_{\frac{2}{3}}W_{\frac{1}{3}})O_3$$

(assuming the total niobium and iron in the dielectric material is incorporated into perovskite phase) wherein x is between about 0.8 and 0.92, y is between about 0.005 and 0.165 and z is between about 0.035 and 0.075.

The exact chemical form of the constituents in the lead-containing oxide component is not known, although it is believed that a significant portion of the constituents are in perovskite crystalline phase. It is believed that in many advantageous dielectric materials of this invention that at least some of the perovskite phase is lead-deficient, and that at least some MgO and/or $WO_3$ is not chemically combined in perovskite structure. In some instances, the amount of MgO in the dielectric material is greater than that which can, on a theoretical basis, be contained in perovskite structures based on the total iron, niobium and tungsten contained in the dielectric material, e.g., up to about 20 mole percent, say, about 2 to 10 or 15 mole percent greater. In some instances, the amount of $WO_3$ in the dielectric material is greater than that which can, on a theoretical basis, be contained in perovskite structures based on the total iron, niobium and magnesium contained in the dielectric material, e.g., up to about 10, say, about 0.01 to 5, mole percent greater.

The constituents for the lead-containing oxide component may be provided as oxides (including complex oxides such as perovskites) or elements or compounds that convert to oxides under preparation conditions (e.g., calcination conditions) to make the dielectric material Thus, the constituents may include oxides such as PbO, MgO, $Nb_2O_5$, etc., super oxides, peroxides, hydroxides, carbonates, nitrates, nitrites, acetates, oxalates, metal powder such as Fe, and the like. The constituents are preferably finely divided, e.g., particle sizes of less than about 10 microns, e.g., about 0.1 to 5 microns in average particle size, more readily enable a relatively uniform distribution of components and more readily enable the formation of relatively uniform solid solution When the constituents are added as precursors to oxides or precursors to perovskites (e.g., PbO, MgO and $Nb_2O_5$), suitable pretreatments prior to sintering are usually conducted. For instance, the precursor material may calcined, e.g., in oxygen-containing atmosphere, at temperatures sufficient to promote degradation to the oxide and/or formation of perovskite crystalline structure.

The dielectric materials of this invention are prepared in the presence of two types of sintering aids. The first type is cadmium-containing sintering aid The cadmium-containing component is often present in an amount to reduce the sintering temperature (which produces the optimum dielectric constant) by at least about 20° C. as compared to a similar composition but not containing the cadmium-containing component. Frequently, the cadmium-containing component comprises about 1 to 5, say, 2 to 4, weight percent based on the total weight of the dielectric material. While not wishing to be limited to theory, it is believed that the cadmium-containing component is essentially in the form of CdO in the dielectric material. The cadmium-containing component is frequently provided as CdO to make the dielectric material although other compounds of cadmium such as hydroxide, carbonate, titanate, zirconate, oxalate, acetate, etc., may find application.

The other sintering aid is a lead-containing glass frit having a melting point of between about 650° and 900° C. The glass frit should advantageously be sufficiently high melting that its viscosity is not unduly low at the sintering temperature used in forming the dielectric composition. Hence, with higher sintering temperatures, higher melting point glass frits within the 650° to 900° C. temperature range are preferably used. Often, the melting temperature of the frit is below about 775° C. This sintering aid often contains from about 20 to 70 weight percent lead oxide and one or more of (represented as oxides) $GeO_2$, $SiO_2$, $Bi_2O_3$, ZnO, $Al_2O_3$, CuO and $B_2O_3$. Representative glass frits are set forth in the following table:

| Component (expressed as oxide) | Weight Percent Based on Glass Frit | | | | | |
| --- | --- | --- | --- | --- | --- | --- |
| | Frit A | Frit B | Frit C | Frit D | Frit E | Frit F |
| PbO | 80.6 | 61.6 | 24.8 | 61.6 | 68.6 | 64.6 |
| $GeO_2$ | 14.8 | — | — | — | — | — |
| $SiO_2$ | 4.6 | 2.5 | 4.9 | 2.5 | 4.5 | 9.3 |
| $Bi_2O_3$ | — | 2.4 | 24.5 | 2.4 | 2.4 | 2.2 |
| ZnO | — | 15.2 | 4.0 | 15.2 | 15.2 | 13.7 |
| $Al_2O_3$ | — | — | 1.0 | — | — | — |
| CuO | — | 3.8 | — | 3.8 | 3.8 | 3.4 |
| $B_2O_3$ | — | 14.5 | 5.2 | 14.5 | 5.5 | 6.8 |
| CdO | — | — | 35.5 | — | — | — |

The amount of glass frit used should be relatively small to minimize the effect of the frit on the electrical performance of the dielectric material. Often, the frit, including lead oxide contained therein is in an amount less than about 5, preferably less than about 3, say, about 0.2 to 3, weight percent based on the total weight of the dielectric material. The lead oxide provided by the frit may enter into the perovskite phase structure of the dielectric material and thus is included in calculating the total lead oxide content of the dielectric material. The residue from the glass frit, i.e., components which are not volatilized or capable of entering into a perovskite phase in the dielectric material such as lead oxide, often comprise about 0.2 to 2 weight percent based on the total weight of the dielectric material. The sintering aid residue often forms a distinct phase from the perovskite phase.

The dielectric material also contains as transition metal component at least one of titanium dioxide, zirconium oxide and hafnium oxide, at least some of which is believed to be in the form of $TiO_3^{-2}$, $ZrO_3^{-2}$ or $HfO_3^{-2}$ in the fired dielectric material. The total titanium dioxide, zirconium dioxide and hafnium dioxide is present in an amount sufficient to increase the insulation resistance of the dielectric material. Often, the amount of transition metal component (calculated as the oxide) is between about 0.25 and 5, say, about 0.5 and 3, weight percent based on the total weight of the dielectric material. The transition metal is preferably present in an atomic ratio to cadmium of between about 0.7:1 to 1.5:1, preferably, about 0.9:1 to 1.5:1, and most preferably, about 0.95:1 to 1.05:1. The transition metal may combine with, e.g., lead to form lead titanate.

The dielectric material may contain one or more adjuvants. Preferably, the dielectric material comprises sufficient manganese (calculated as manganese dioxide) to enhance insulation resistance. Often, the manganese dioxide is present in an amount of about 0.02 to 0.2 weight percent based on the total weight of the dielectric material. If too much manganese is present, the dielectric constant of the dielectric material may be depressed. The specie or species in which the manganese resides and its valence in the dielectric are not known, but it is believed that the manganese enters the perovskite phase. The dielectric material may contain about 0.001 to 5 weight percent of other adjuvants such as oxides of strontium, barium, nickel, cobalt, yttrium, indium, tantalum, tin, lithium, ytterbium, cerium, samarium, selenium, tellurium, lanthanum, rhenium and mixtures thereof.

The adjuvants may be added in any convenient form that provides the sought active form upon firing. Hence, the components may be added as oxides, oxalates, acetates, carbonates, hydroxides, or the like.

The dielectric material may be prepared in any suitable manner. Most frequently, the components, especially for the perovskite phase, are intimately admixed, calcined, and ground for further intimate admixing with other components for the dielectric and with agents to enable the components to be fabricated into a greenware body of desired dimensions. The greenware body may have layers coated with conductive metal to form internal electrodes. Conveniently, the conductive metal is in the form of a paint which can be easily applied to the layer of greenware. The conductive metal may be palladium, platinum, or, due to the lower sintering temperatures useful in making the dielectric materials of this invention, less expensive silver or high silver-content alloys. The greenware is sintered to produce the dielectric material.

In further detail of preferred processes for making the dielectric material of this invention, metal oxide powders, less the glass frit component, are slurried in deionized water and ball milled for 1 to 24 hours or more using hard, ceramic balls, e.g., zirconia balls. The slurry contains sufficient water to effect the milling, for instance, about 0.8 to 1.5 milliliters of water per gram of metal oxide powder. The slurry may be dried, reground to, say, about 0.1 to 30, e.g., 0.2 to 10, microns maximum particle size, and calcined to effect reactions, including perovskite phase-forming reactions. The calcining is conveniently conducted in an air atmosphere at a temperature below sintering temperature (i.e., sintering temperatures are those at which densification occurs). Typical calcining temperatures are from about 600° to 900° C., say, 700° to 800° C. The calcining may be for as little as several minutes, but most often is for a period of from about 0.5 to 5 or more hours.

After calcining, the metal oxide mixture is again slurried with water and the glass frit is added to the slurry. The slurry is milled using hard balls for 1 to 24 hours or more. After ball milling, binder materials are added. These materials include surfactants and polymeric material. Polymeric materials include polyvinyl alcohol, polyethylene glycols, polysaccharides (e.g., cellulosics such as carboxymethyl cellulose starch), polyacrylates, polymethacrylates, waxes, etc. The amount of binder materials is sufficient to provide a workable binderized powder and will depend upon the binder materials used. Generally, the amount of binder material is less than about 15 weight percent based on the total weight of the metal oxides.

The binderized powder is fabricated into sheets which may be 0.01 to 1 or more millimeters in thickness. The sheets are coated with the conductor paint, e.g., silver powder or flake in a carrier vehicle, cut and stacked to form the desired laminar capacitor body. This greenware is then sintered. Sintering temperatures are often at least about 800° C., say, about 850° or 860° to 950° or 970° C. In preferred aspects of this invention, the sintering temperature is less than about 900° C. The sintering is generally conducted in an oxygen-containing atmosphere that is otherwise substantially inert with respect to the constituent oxides. Most often, air is used as the atmosphere. To prevent undue lead oxide volatilization, the sintering may be conducted in a lead oxide-containing atmosphere. The sintering may be from 0.5 to 40 hours or more. Due to the presence of organics in the greenware such as surfactants and polymeric materials, the greenware is usually brought to the sintering temperature slowly to allow outgassing. A bake-out step is often used at which the greenware is gradually heated to a temperature of about 350° to 600° C. to oxidize and/or volatilize the organics. The bake-out step may be for 1 to 48 hours or more.

The following examples are provided in further illustration of the invention and are not in limitation thereof. All parts and percentages are by weight unless otherwise noted or clear from the context.

EXAMPLES 1 TO 16

In these examples, the following general procedure is used. Approximately 1000 grams of a metal oxide mixture of powders of lead oxide, niobium oxide, magnesium carbonate (calculated as magnesium oxide), cadmium oxide, ferric oxide, titanium dioxide, tungsten oxide and, if present, ceric oxide in the weight percentages set forth in Table I, are placed in a polyurethane lined can with about 1000 grams of deionized water. Manganese as the acetate, carbonate or oxide is also added to the mixture in the amounts (calculated at $MnO_2$) set forth in Table I. The slurry is ball milled (Vibroenergy™ grinding mill available from Sweco) with about 5/16 inch diameter zirconia balls for about 12 hours. The milled slurry is dried in a convection oven at about 95° C. and the solids are placed in an alumina box with a lid and calcined at about 750° C. for two hours. The calcined solids are ground with a mortar and pestle and glass frit is added as set forth in Table II. The mixture is again placed in a polyurethane lined can with deionized water in the amounts set forth in Table II and milled using 5/16 inch zirconia balls for about 12 hours. After milling, organic components to make a binderized powder are added under agitation with a magnetic stirrer. The details of the ingredients and amounts are set forth in Table II. After the addition of the organic ingredients, the slurry is deaired under vacuum until any foam disappears (about 1 hour) and then cast on a stainless steel belt to produce a tape about 3.5 inches (8.9 centimeters) wide and about 0.0015 inch (0.038 millimeter) in thickness. The metal for the internal electrodes as specified in Table II is screened onto the tape, the tape is layered in alternating directions (between 12 and 37 layers) and compressed to about 12000 pounds per square inch gauge in a press to form a laminate. The laminate is diced. The individual greenware bodies are subjected to a bake-out over a period of about 36 hours with the maximum temperature being about 500° C. The bodies are cooled and placed in an alumina box having a lid. About 20 grams of lead niobate are also contained in the alumina box to provide a high partial pressure of lead oxide and therefore minimize lead oxide volatilization from the bodies during sintering.

The greenware bodies are sintered in a tubular furnace having an internal diameter of about 3.5 inches (8.9 centimeters) for the times and temperatures set forth in Table III. The sintered bodies are evaluated. Table III summarizes the electrical performance of capacitors, and the results are the average from 24 samples.

TABLE I

| Example | PbO wt % | $Nb_2O_5$ wt % | MgO wt % | CdO wt % | $Fe_2O_3$ wt % | $TiO_2$ wt % | $WO_3$ wt % | $CeO_2$ wt % | $MnO_2$ grams |
|---|---|---|---|---|---|---|---|---|---|
| 1 | 65.49 | 23.39 | 4.30 | 2.68 | 1.19 | 1.66 | 1.29 | 0 | 0.5 |
| 2 | 64.79 | 23.14 | 4.25 | 2.65 | 2.24 | 1.65 | 1.28 | 0 | 0.5 |
| 3 | 65.14 | 23.27 | 4.28 | 2.66 | 1.72 | 1.65 | 1.28 | 0 | 0.5 |
| 4 | 65.56 | 23.42 | 4.30 | 2.68 | 1.73 | 1.66 | 0.65 | 0 | 0.5 |
| 5 | 66.82 | 22.08 | 4.27 | 2.01 | 1.63 | 1.57 | 1.22 | 0.40 | 0.5 |
| 6 | 66.20 | 21.87 | 4.34 | 2.50 | 1.62 | 1.56 | 1.81 | 0.10 | 0.5 |
| 7 | 66.41 | 21.94 | 4.35 | 2.51 | 1.62 | 1.56 | 1.21 | 0.40 | 0.5 |
| 8 | 66.33 | 19.80 | 3.34 | 1.93 | 4.27 | 1.20 | 2.81 | 0.32 | 0.53 |
| 9 | 66.30 | 18.75 | 2.85 | 1.64 | 5.57 | 1.02 | 3.60 | 0.27 | 0.53 |
| 10 | 66.40 | 21.40 | 4.10 | 2.36 | 2.29 | 1.47 | 1.61 | 0.39 | 0.47 |
| 11 | 66.22 | 22.39 | 4.59 | 2.64 | 0.97 | 1.64 | 1.12 | 0.43 | 0.58 |
| 12 | 66.76 | 22.06 | 3.84 | 2.52 | 1.63 | 1.57 | 1.22 | 0.40 | 0.5 |
| 13 | 66.50 | 21.96 | 4.24 | 2.51 | 1.62 | 1.56 | 1.21 | 0.40 | 0.5 |
| 14 | 66.34 | 21.91 | 4.45 | 2.51 | 1.62 | 1.56 | 1.21 | 0.40 | 0.5 |
| 15 | 65.50 | 24.13 | 4.30 | 2.68 | 1.73 | 1.66 | 0 | 0 | 0.5 |
| 16 | 65.91 | 22.36 | 4.33 | 2.69 | 1.74 | 1.67 | 1.30 | 0 | 0.5 |

TABLE II

| Example | Powder grams | Frit Type | Frit, grams | Water, grams | Dispersant[b] grams | Latex. Type | Latex, grams | Electrode Ink |
|---|---|---|---|---|---|---|---|---|
| 1 | 490 | F | 10 | 140 | 5.5 | M[d] | 96 | Ag |
| 2 | 490 | F | 10 | 140 | 5.5 | M | 96 | Ag |
| 3 | 490 | F | 10 | 135 | 5.5 | M | 100 | Ag |
| 4 | 490 | F | 10 | 140 | 5.5 | M | 100 | 25/75 Pd/Ag |
| 5 | 490 | F | 10 | 130 | 5.5 | M | 100 | Ag |
| 6 | 490 | E | 10 | 120 | 5.5 | N[e] | 80.65 | Ag |
| 7 | 490 | F | 10 | 120 | 5.5 | M | 100 | Ag |
| 8[a] | 500 | — | — | 140 | 6.0 | O[f] | 86 | 25/75 Pd/Ag |
| 9[a] | 500 | — | — | 140 | 6.0 | O | 86 | 25/75 Pd/Ag |
| 10 | 490 | E | 10 | 115 | 5.0 | P[g] | 81.08 | Ag |
| 11 | 490 | E | 10 | 115 | 5.0[c] | P | 81.08 | Ag |
| 12 | 490 | F | 10 | 135 | 5.75 | M | 100 | Ag |
| 13 | 490 | F | 10 | 170 | 6.0 | M | 100 | Ag |
| 14 | 490 | F | 10 | 120 | 5.5 | M | 100 | Ag |

TABLE II-continued

| Example | Powder grams | Frit Type | Frit, grams | Water, grams | Dispersant[b] grams | Latex, Type | Latex, grams | Electrode Ink |
|---|---|---|---|---|---|---|---|---|
| 15[a] | 490 | F | 10 | 140 | 5.5 | M | 100 | Ag |
| 16 | 490 | F | 10 | 140 | 5.5 | M | 96 | Ag |

[a]Comparative.
[b]NOPCOSPERSE TM 44, polyacrylate dispersant available from Henkel Corp.
[c]Also contained 0.05 grams of Pluronics TM 31R1 non-ionic surfactant available from BASF-Wyandotte.
[d]A 50:50 weight mixture of DuPont 5310 and 5320 polyacrylate latex available from E. I. duPont de Nemours Co.
[e]B. F. Goodrich 2679 polyacrylate latex available from B. F. Goodrich.
[f]N-24 acrylic latex, available from Abco, Roebuck, South Carolina.
[g]B-60A acrylic latex, available from Rohm & Haas Company.

TABLE III

| | | Sintering | | Dielectric | Dissipation | Capacitance times Resistance, ohms-farads $\times 10^{-3}$ | |
|---|---|---|---|---|---|---|---|
| Example | Run | Temp °C. | Time, hr | Constant | Factor, % | at 25° C. | at 85° C. |
| 1 | a | 870 | 3 | 9870 | 0.7 | 26 | 13 |
| | b | 855 | 3 | 10160 | 0.9 | 38 | 13 |
| 2 | | 860 | 3 | 11520 | 2.0 | 16 | 6 |
| 3 | a | 866 | 3 | 12710 | 1.3 | 50 | 13 |
| | b | 872* | 3 | 9940 | 0.7 | 31 | 14 |
| | c | 878 | 3 | 10810 | 1.1 | 41 | 12 |
| 4 | a | 870 | 3 | 13400 | 3.4 | 32 | 10 |
| | b | 890 | 3 | 12200 | 2.5 | 30 | 14 |
| 5 | | 880 | 3 | 11500 | 1.3 | 17 | 8 |
| 6 | | 880 | 3 | 6960 | 0.3 | 23 | 10 |
| 7 | a | 900 | 2 | 10400 | 0.9 | 26 | 6 |
| | b | 875 | 6 | 11140 | 0.8 | 20 | 7 |
| 8 | a | 910 | 2 | 10870 | 0.6 | 59 | 7 |
| | b | 880 | 2 | 10450 | 0.7 | 36 | 3 |
| 9 | | 900 | 3 | 10160 | 0.5 | 22 | 1 |
| 10 | a | 915 | 2 | 9010 | 0.9 | 11 | 5 |
| | b | 875 | 2 | 8390 | 0.8 | 16 | 3 |
| 11 | a | 910 | 3 | 9730 | 1.0 | 31 | 15 |
| | b | 880 | 2 | 9590 | 0.9 | 29 | 16 |
| 12 | a | 900 | 2 | 9280 | 0.6 | 8 | 2 |
| | b | 850 | 3 | 7140 | 0.6 | 8 | 2 |
| 13 | | 900 | 2 | 10010 | 0.5 | 15 | 7 |
| 14 | | 890 | 3 | 10400 | 0.9 | 26 | 6 |
| 15 | | 870 | 3 | 11920 | 2.9 | 22 | 10 |
| 16 | | 860 | 3 | 9700 | 1.7 | 4 | 2 |

*no lead niobate contained in alumina box

A multilaminar capacitor prepared by a process similar to that described in Example 3 above is examined by scanning electron microscopy equipped with EDAX. FIG. 1 is a photomicrograph from the examination. The region generally indicated by 10 is lead-containing perovskite and appears to be continuous. Areas identified by the numeral 12 are rich in cadmium and are believed to be cadmium oxide islets. The area identified as 14 is zinc-rich and is thus a sintering aid residue. The region generally marked with the broken lines and identified as 16 is the conductor metal electrode. Region 18 is a void.

EXAMPLES 17 TO 19

(Comparative)

In these examples, the following generalized procedure is used. Approximately 100 grams of a metal oxide mixture of powders of lead oxide, niobium oxide, magnesium carbonate (calculated as magnesium oxide), cadmium oxide, ferric oxide, titanium dioxide, tungsten oxide, ceric oxide, manganese dioxide and (to the extent that the formulation contains them) in the amounts set forth in Table IV, are placed in a polyethylene bottle with sufficient deionized water for milling (about 100 grams). The slurry is ball milled (Vibroenergy TM grinding mill) with about 5/16 inch diameter zirconia balls for about 12 hours. The slurry is dried at about 95° C. in a stainless steel pan and then crushed using a mortar and pestle. The ground solids are calcined at about 750° C. for two hours and thereafter milled for 12 hours using the procedure described above. The slurry is then dried and ground using the procedure described above and mixed with a 3 weight percent aqueous latex solution (Abco N-24 acrylic latex) to prepare a binderized powder. The binderized powder is placed into a round die (about one centimeter in diameter) and hand pressed to form a firm, solid disk having a thickness of about 1 millimeter. Five disks from each slip batch are placed in an alumina box with a lid together with about 20 grams of lead titanate powder and sintered in the tube furnace described in Examples 1 to 16. The temperature is raised and lowered at a rate of about 200° C. per hour. The sintering time is the time at peak temperature. The sintered disks are painted to form a circle about 2 millimeters from the edge of the disk on each side with a silver-containing paint which also contains borosilicate frit. The paint is dried at 95° C. and then fired at 700° C. The details of the sintering and electrical properties of the disk capacitors are evaluated and the results are provided in Table V.

TABLE IV

| Example | PbO wt % | Nb₂O₅ wt % | MgO wt % | CdO wt % | Fe₂O₃ wt % | TiO₂ wt % | WO₃ wt % | CeO₂ wt % | MnO₂ wt % | Glass Frit wt % | Glass Frit Type |
|---|---|---|---|---|---|---|---|---|---|---|---|
| 17 | 64.76 | 25.21 | 3.82 | 3.07 | 0.30 | 1.91 | 0.43 | 0.50 | — | — | — |
| 18 | 65.99 | 12.71 | — | — | 13.09 | — | 8.14 | — | 0.07 | — | — |
| 18A | 65.99 | 12.71 | — | — | 13.09 | — | 8.14 | — | 0.07 | 2.0 | Frit A |
| 18B | 65.99 | 12.71 | 3.0 | — | 10.09 | — | 8.14 | — | 0.07 | — | — |
| 19-1 | 66.41 | 21.94 | 4.35 | 2.51 | 1.62 | 1.56 | 1.21 | 0.40 | 0.05 | — | — |
| 19-2 | 66.36 | 20.86 | 3.84 | 2.95 | 2.21 | 1.37 | 2.21 | 0.36 | 0.05 | — | — |

TABLE V

| Example | Disk No. | Sintering Temp °C. | Sintering Time hr | Dielectric Constant | Dissipation Factor, % | Insulation Resistance 25° C., ohm-cm × 10¹² |
|---|---|---|---|---|---|---|
| 17 | 1 | 965 | 2 | 5140 | 0.9 | 3.1 |
|  | 2 | 965 | 2 | 5270 | 0.8 | 3.5 |
|  | 3 | 965 | 2 | 4870 | 0.8 | 3.5 |
| 18 |  | 1000 | 2 | 16310 | 0.2 | 0.091 |
| 18A |  | 955 | 2 | 13730 | 3.8 | 0.0001 |
| 18B |  | 1025 | 2 | 3270 | 0.1 | 0.5 |
| 19-1 |  | 900 | 2 | 7070 | 0.7 | 5 |
| 19-2 |  | 900 | 2 | 7110 | 1.0 | 4.3 |

As can be seen from a comparison of Examples 18 and 18A, the addition of glass frit, while reducing the sintering temperature, adversely affects the electrical performance of the dielectric material, i.e., the dielectric constant is reduced, the dissipation factor is increased and the insulation resistance is significantly lowered. In the dielectrics of this invention, while the glass frit will deteriorate the electrical performance of the dielectric material, the effect is much less severe.

It is claimed:

1. A lead magnesium niobate perovskite-rich dielectric material which is capable of being formed from a mixture of oxide powders which is sintered at relatively low temperatures, comprising:
   (a) lead-containing oxide component (expressed in terms of oxides) consisting essentially of 2 to 5 weight percent MgO, 15 to 30 weight percent $Nb_2O_5$, 0.5 to 7 weight percent $Fe_2O_3$, 0.5 to 5 weight percent $WO_3$ and PbO wherein the amount of lead (based on the total lead in the dielectric material) is between about 85 to 110 atomic percent of that required on a stoichiometric basis to satisfy the relationship:

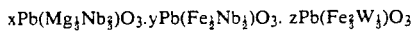
   $xPb(Mg_{\frac{1}{3}}Nb_{\frac{2}{3}})O_3 \cdot yPb(Fe_{\frac{1}{2}}Nb_{\frac{1}{2}})O_3 \cdot zPb(Fe_{\frac{2}{3}}W_{\frac{1}{3}})O_3$ (based on the total iron and niobium in the dielectric material) wherein x is between about 0.8 and 0.92, y is between about 0.005 and 0.165 and z is between about 0.035 and 0.075; wherein the atomic ratio of tungsten to iron (based on the total tungsten and iron in the dielectric material) is less than about 0.49:1; and wherein the atomic ratio of magnesium to niobium (based on the total magnesium and niobium in the dielectric material) is between about 0.55:1 and 0.42:1,
   (b) cadmium component (expressed in terms of CdO) in an amount of about 1 to 5 weight percent based on the dielectric material,
   (c) transition metal component (expressed in terms of oxides) of at least one of $TiO_2$, $ZrO_2$ and $HfO_2$, said transition metal component being in an amount sufficient to increase the insulation resistance of an otherwise identical material but not containing the transition metal component, and
   (d) sintering aid residue (expressed in terms of oxides) in an amount of about 0.2 to 2 weight percent based on the total weight of the material, said sintering aid residue comprising one or more of $GeO_2$, $SiO_2$, $Bi_2O_3$, ZnO, $Al_2O_3$, CuO and $B_2O_3$, which as the sintering aid are provided in combination with PbO such that the sintering aid has a melting point of between about 650° and 900° C.

2. The dielectric material of claim 1 wherein the lead-containing oxide component contains 60 to 71 weight percent lead.

3. The dielectric material of claim 2 wherein the lead-containing oxide component is lead deficient from that required on a stoichiometric basis to form perovskite structures.

4. The dielectric material of claim 3 wherein the atomic ratio of W:Fe in the dielectric material is between about 0.4:1 to 0.48:1.

5. The dielectric material of claim 3 wherein the atomic ratio of Mg:Nb is between about 0.4:1 to 0.55:1.

6. The dielectric material of claim 3 wherein the dielectric material comprises 0.02 to 0.2 weight percent manganese (calculated as manganese dioxide.

7. The dielectric material of claim 6 wherein the atomic ratio of W:Fe in the dielectric material is between about 0.4:1 to 0.48:1.

8. The dielectric material of claim 7 wherein the atomic ratio of Mg:Nb is between about 0.4:1 to 0.55:1.

9. The dielectric material of claim 8 wherein the dielectric material has a Curie temperature within the range of about 10° to 35° C.

10. The dielectric material of claim 8 wherein the dielectric material is capable of being sintered at a temperature less than about 900° C. while providing a dielectric constant greater than about 10,000 at 25° C.

11. A dielectric material comprising at least three discrete phases:
    (a) continuous, lead-containing oxide rich phase comprising (expressed as oxides) PbO, $Nb_2O_5$, $Fe_2O_3$, MgO and $WO_3$;
    (b) discontinuous, cadmium-containing phase consisting essentially of cadmium oxide; and
    (c) discontinuous, sintering aid residue-containing phase comprising (expressed as oxides) one or more of $GeO_2$, $SiO_2$, $Bi_2O_3$, ZnO, $Al_2O_3$, CuO and $B_2O_3$, wherein the dielectric material contains the following expressed as oxides in weight percent based on their total weight:

| | |
|---|---|
| PbO | 55 to 69% |
| $Nb_2O_5$ | 18 to 30% |
| MgO | 2 to 5% |
| $Fe_2O_3$ | 0.5 to 7% |
| $WO_3$ | 0.5 to 5% |
| CdO | 0.5 to 5% |
| $TO_2$ | 0.5 to 3.5% |
| RO | 0.2 to 2% | wherein $TO_2$ is one or more of $TiO_2$, $ZrO_2$ and $HfO_2$ and RO is sintering aid residue.

12. The dielectric material of claim 11 wherein the amount of lead is between about 85 to 110 atomic percent of that required on a stoichiometric basis to satisfy the relationship:

$$xPb(Mg_{\frac{1}{3}}Nb_{\frac{2}{3}})O_3 \cdot yPb(Fe_{\frac{2}{3}}Nb_{\frac{1}{3}})O_3 \cdot zPb(Fe_{\frac{1}{2}}Nb_{\frac{1}{2}})O_3$$

wherein x is between about 0.8 and 0.92, y is between about 0.005 and 0.165 and z is between about 0.035 and 0.075.

* * * * *